US012581313B2

(12) United States Patent　(10) Patent No.:　US 12,581,313 B2
Henry et al.　(45) Date of Patent:　Mar. 17, 2026

(54) ADAPTIVE PRESENCE-BASED ACCESS POINT RADIO CONFIGURATION

(71) Applicant: Cisco Technology, Inc., San Jose, CA (US)

(72) Inventors: Jerome Henry, Pittsboro, NC (US); Robert Edgar Barton, Richmond (CA); Fred Jay Anderson, Lakeville, OH (US); Matthew Aaron Silverman, Shaker Heights, OH (US); John Matthew Swartz, Lithia, FL (US); Joshua D. Suhr, Lenexa, KS (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 700 days.

(21) Appl. No.: 17/977,169

(22) Filed: Oct. 31, 2022

(65) Prior Publication Data

US 2024/0147245 A1　　May 2, 2024

(51) Int. Cl.
H04W 16/10　　(2009.01)
(52) U.S. Cl.
CPC ................................... H04W 16/10 (2013.01)
(58) Field of Classification Search
CPC ............................. H04W 16/10; H04W 16/18
See application file for complete search history.

(56) References Cited

U.S. PATENT DOCUMENTS

2015/0327164 A1* 11/2015 Madan ................... H04L 43/045
　　　　　　　　　　　　　　　　　　　370/254
2017/0251414 A1* 8/2017 Ghazi-Moghadam .......................
　　　　　　　　　　　　　　　　　　　H04W 24/02
2018/0242169 A1* 8/2018 Kowal ................... H04W 24/02
2019/0191369 A1* 6/2019 Desai ................... H04W 52/245
2020/0092793 A1* 3/2020 Henry ................. H04W 64/003
2021/0250783 A1* 8/2021 Zhao ..................... H04W 24/08

OTHER PUBLICATIONS

Xtricom, "TheExtricomLargePublicVenueSolution,"https:/Avww.winncom.com/pdf/Extricom_LV_2000/xtricom_LV-2000.pdf, Aug. 2013, 4 pages. (Year: 2013).*
Extricom, "The Extricom Large Public Venue Solution," https://www.winncom.com/pdf/Extricom_LV_2000/Extricom_LV-2000.pdf, Aug. 2013, 4 pages.

* cited by examiner

*Primary Examiner* — Yuwen Pan
*Assistant Examiner* — Swati Jain
(74) *Attorney, Agent, or Firm* — Edell, Shapiro & Finnan, LLC

(57) ABSTRACT

A method for adaptive presence-based radio configuration of access points in a venue includes defining a number of regions in the venue in which access points are deployed, each region having a center point, and assigning a first access point to a first region, positioned at the center of the first region. The method also includes affecting a first energy level in the first region, which corresponds to a power of a transmit signal emitted by the first access point, and assigning to the first region a configurable capacity value that determines an acceptable overlap constraint between the first energy level of the first region and an energy level of a neighboring region. The method further includes generating data describing a tessellation graph in which a possible map of the access points is formed using an iterative descent process based on the first energy level and the overlap constraint.

20 Claims, 8 Drawing Sheets

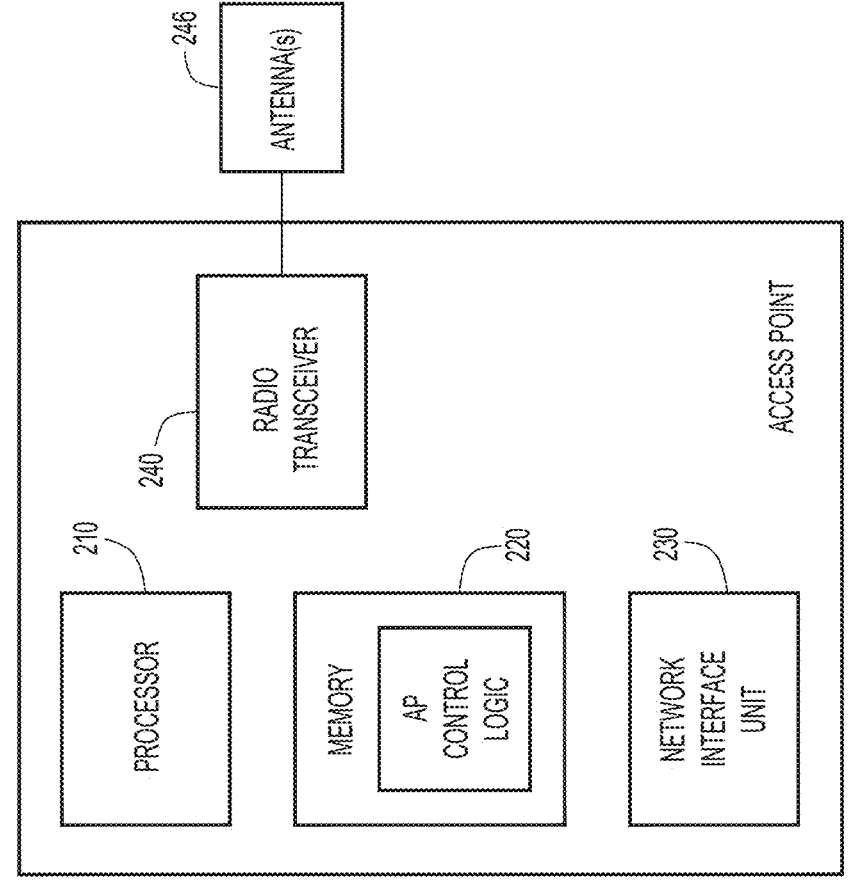
FIG.1B

390(A) - REJECTED CANDIDATES, FIRST AP SIGNAL TOO LOUD (C FAILURE)
390(C) - POSSIBLE CANDIDATES (C SUCCESS)
390(B) - REJECTED CANDIDATES, FIRST AP SIGNAL TOO WEAK (C FAILURE)

FIRST EXPLORATION, EACH NEIGHBOR IS CANDIDATE

FINAL SOLUTION, AFTER C AND F FACTORS OPTIMIZATION

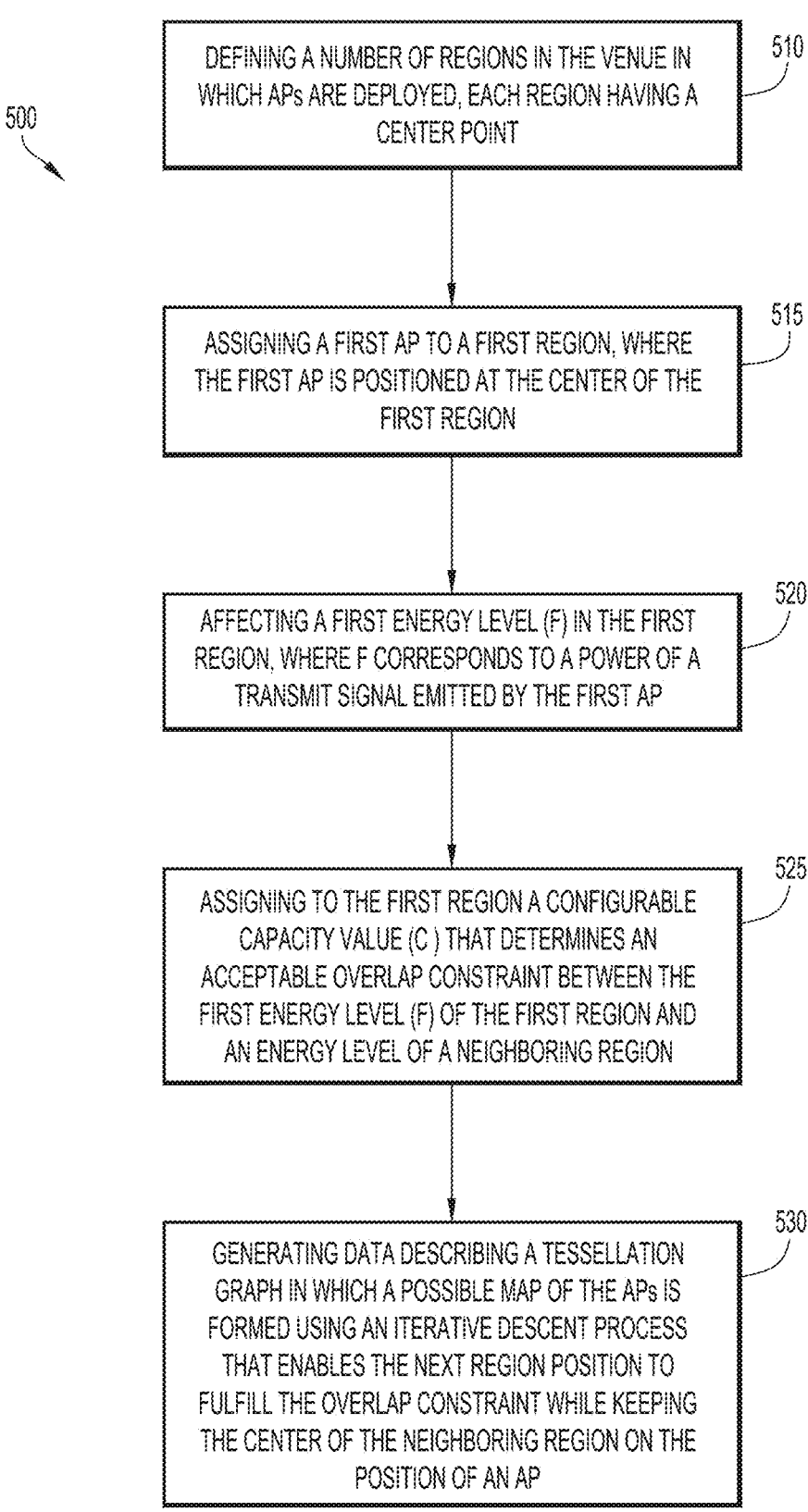

500

DEFINING A NUMBER OF REGIONS IN THE VENUE IN WHICH APs ARE DEPLOYED, EACH REGION HAVING A CENTER POINT — 510

ASSIGNING A FIRST AP TO A FIRST REGION, WHERE THE FIRST AP IS POSITIONED AT THE CENTER OF THE FIRST REGION — 515

AFFECTING A FIRST ENERGY LEVEL (F) IN THE FIRST REGION, WHERE F CORRESPONDS TO A POWER OF A TRANSMIT SIGNAL EMITTED BY THE FIRST AP — 520

ASSIGNING TO THE FIRST REGION A CONFIGURABLE CAPACITY VALUE (C ) THAT DETERMINES AN ACCEPTABLE OVERLAP CONSTRAINT BETWEEN THE FIRST ENERGY LEVEL (F) OF THE FIRST REGION AND AN ENERGY LEVEL OF A NEIGHBORING REGION — 525

GENERATING DATA DESCRIBING A TESSELLATION GRAPH IN WHICH A POSSIBLE MAP OF THE APs IS FORMED USING AN ITERATIVE DESCENT PROCESS THAT ENABLES THE NEXT REGION POSITION TO FULFILL THE OVERLAP CONSTRAINT WHILE KEEPING THE CENTER OF THE NEIGHBORING REGION ON THE POSITION OF AN AP — 530

FIG.4

TESSELLATION FOR THIS REGION IS REBUILT

USER DENSITY INCREASE DETECTED IN THIS REGION

ADAPTIVE PRESENCE-BASED ACCESS POINT RADIO CONFIGURATION

TECHNICAL FIELD

The present disclosure relates to configuring radios of wireless access points distributed in a large public venue.

BACKGROUND

In a large public venue environment, such as a stadium, it is becoming common practice to place Wi-Fi® access points (APs) below seats, with the reasoning that the crowd covering the AP and its cell will absorb the AP's signal, thus allowing for high AP density (useful in a large public venue environment) and yet promoting aggressive channel reuse (as each AP signal is dampened within 10 to 15 meters by the crowd).

This model works well in a full venue scenario. However, when the venue is not full, the signals from multiple APs bleed, causing interference among nearby APs. This situation can occur when the large public venue is not filled to capacity (e.g., local team supporters are present, but guest team supporters are sparse, concerts where the stage is at one end of the facility and none of the seats behind it are sold, some events purposefully sell limited tickets, etc.).

Radio Resource Management (RRM) involves methods to reduce the output power of an AP to limit channel overlap among APs. However, RRM generally concerns the configuration of AP transmit signals, and ignores varying densities of clients or users. RRM methods are also not designed for under the seat scenarios.

BRIEF DESCRIPTION OF THE DRAWINGS

FIG. 1B is a block diagram of an access point of the system of FIG. 1A, according to an example embodiment.

FIG. 4 is a flow chart of a method for adaptive presence-based access point radio configuration, according to an example embodiment.

DETAILED DESCRIPTION

Overview

According to an aspect of the present disclosure, a method for adaptive presence-based radio configuration of access points in a venue is provided. The method includes defining a number of regions in the venue in which a plurality of access points are deployed, each region having a center point, and assigning a first access point to a first region of the regions, and the first access point is positioned at the center point of the first region. The method also includes affecting a first energy level in the first region, wherein the first energy level corresponds to a power of a transmit signal emitted by the first access point, and assigning to the first region a configurable capacity value that determines an acceptable overlap constraint between the first energy level of the first region and an energy level of a neighboring region to the first region. The method further includes generating data describing a tessellation graph in which a possible map of the plurality of access points is formed using an iterative descent process that enables a next region position to fulfill the configurable capacity value while keeping a center of the neighboring region on a position of an access point.

According to another aspect of the present disclosure, the method may additionally include dynamically adapting one or more of an operating mode, a channel structure, and a transmit power level of one or more access points of the plurality of access points to minimize cross-AP interference, wherein the operating mode is one of a passive monitoring mode and an active mode.

Example Embodiments

Example embodiments described herein relate to a system of devices and a method that can dynamically adapt an operational mode of an access point (AP) (including AP transmit power and channel structure) to the density of users in each area around an AP in a large public venue where numerous APs are positioned. These techniques also promote being the large public venue being a "radio frequency (RF) friendly neighbor" where the large public venue is surrounded by other businesses, high rise condos etc.

Figure 1A:
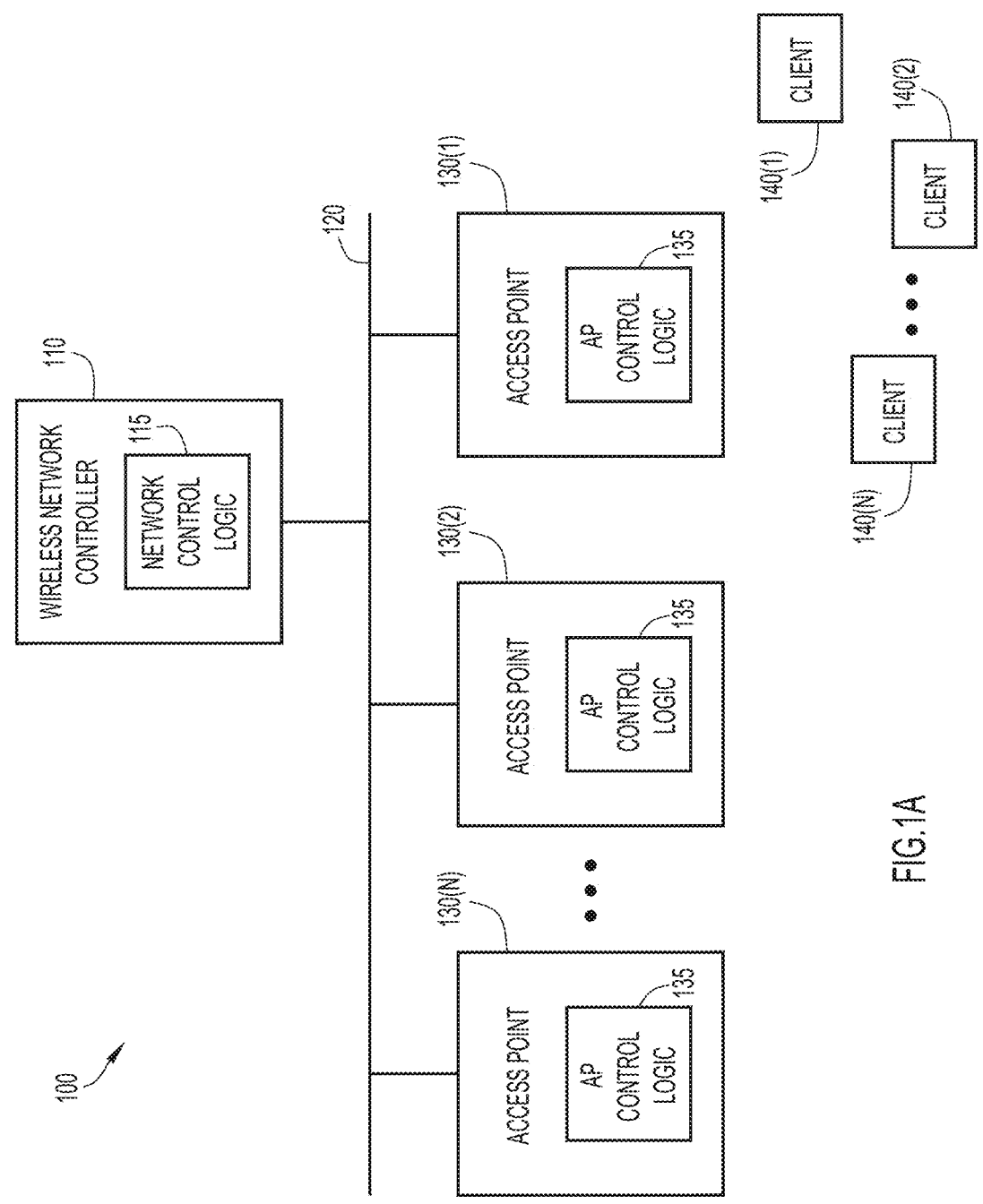
FIG. 1A is a block diagram of a system, including access points and a network controller, configured to provide adaptive presence-based radio configuration for access points in a large public venue with variable density of users, according to an example embodiment.

Referring now to FIG. 1A, a system 100 is shown that is configured to provide adaptive presence-based radio configuration for APs, according to an example embodiment. The system 100 includes a network controller 110 with network control logic 115. The network controller 110 communicates via a network 120 with a plurality of APs 130(1)-130(N) deployed throughout a large public venue. The network 120 may be a local area network (LAN), for example, and may also include connections to other networks (e.g., wide area network (WAN), internet, intranet, etc.). Each of the APs 130(1), 130(2), . . . 130(N) is configured with AP control logic 135. The APs 130(1)-130(N) is configured to wirelessly communicate with wireless client devices, and in so doing, connect wireless client devices to the network 120. FIG. 1A shows wireless client devices 140(1), 140(2), . . . 140(N), each of which is associated with a respective user (not shown). The operations performed by the wireless network controller 110 in executing the network control logic 115 and the operations performed by the APs 130(1)-130(N) in executing the AP control logic 135 are described below.

Reference is now made to FIG. 1B with continued reference to FIG. 1A. Each of the APs 130(1)-130(N), generically denoted as AP 130(i) in FIG. 1B, includes, among other possible components, a processor 210 to process instructions relevant to 120, and a memory 220 to store a variety of data and software instructions (e.g., the AP control logic 135). The AP 130(i) also includes a network interface unit 230 to communicate with computing devices (e.g., wireless network controller 110) and/or computer networks (e.g., network 120). The AP 130(i) further includes a radio transceiver 240 comprising one or more transmitters and one or more receivers connected to one or more antennas 246 to transmit and receive wireless signals to and from the wireless client devices (e.g., wireless client devices 140(1)-140(N)).

The memory 220 may comprise read only memory (ROM), random access memory (RAM), magnetic disk storage media devices, optical storage media devices, flash memory devices, electrical, optical, or other physical/tangible (e.g., non-transitory) memory storage devices. The processor 210 may be, for example, a microprocessor or microcontroller that executes instructions for implementing the processes described herein. Thus, in general, the memory 220 may comprise one or more tangible (non-transitory) computer readable storage media (e.g., a memory device) encoded with software comprising computer executable instructions and when the software is executed by the processor 210 is operable to perform the operations described herein.

Referring back to FIG. 1A, the system 100 is configured, via the network control logic 115 of the network controller 110 and the AP control logic 135 of the APs 130(1)-130(N) to dynamically adapt the AP mode (including transmit power and RF channel structure) to the density of users in each area around each AP in a large public venue in order to limit/reduce/minimize cross-AP interference in a scenario where user density varies (e.g., in various sections of a stadium, over time generally at different stages of events, etc.).

In addition, a method is provided for dynamically adapting an AP mode (i.e., active mode vs. passive/monitoring mode), RF channel utilization and transmit power in a high-density large public venue (LPV) to limit cross-AP interference as user density changes. The density of users and client devices is variable over time and in different scenarios, and this method accounts for varying densities of clients, unlike conventional RRM-based configuration of APs.

At the initial deployment, the APs (e.g., APs 130(1)-130(N)) are positioned in an LPV, such as a stadium or arena, and may be installed under seats (and identified on a floor map) and placed in a "Stadium Mode." In the Stadium Mode, the network controller 110 attempts to configure the AP's RF channel use and transmit power to minimize the cross-AP interference in a scenario where the density of visitors varies.

Several embodiments are possible for this constrained AP configuration scenario, such as an optimization of Lloyd's method based on centroidal Voronoi tessellations. Other alternative embodiments are also possible (e.g., Delaunay triangulation optimization), although the general steps are the same or similar. For example, these steps can be applied based on the position of the APs on a map (if a floorplan is available), or by individual AP detection of neighboring APs (RF-based determination, for cases where no floorplan is available, in which case a graph/constellation of the relative RF positions of the APs is built). In any case, the technique involves creating/defining several regions, along with their associated center point. In some example embodiments, the number of regions created/defined may be the same as the number of available RF channels in the large public venue (based on local constraints like regulatory domain and channel width).

Figure 2A:
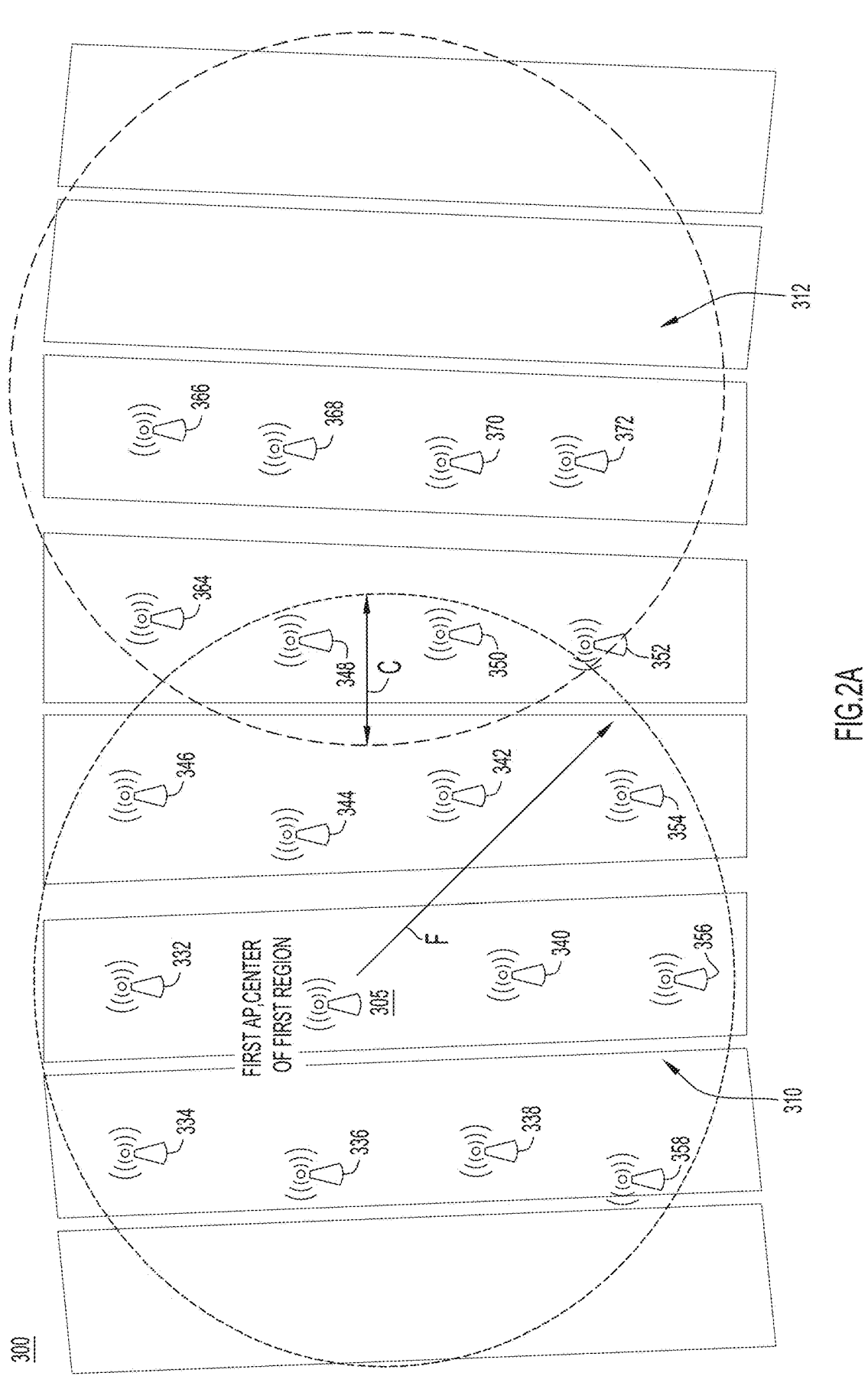
FIG. 2A shows a first region with a first access point assigned to the first region and positioned at its center, according to an example embodiment.

Reference is made now to FIG. 2A, which shows a partial view of a system 300 that includes a first AP 305 that is arbitrarily assigned to a first region 310 and positioned at the center of the first region 310. The system 300 also includes a number of neighboring APs (e.g., 332, 334, 336, 338, 340, 342, 344, 346, 348, 350, etc.) in proximity to the first AP 305.

With the first AP 305 being assigned to the center of the first region 310, the first region 310 is then affected an energy level F, which corresponds to the strength/power of a transmit signal emitted by the first AP 305. In the field of computer vision, Lloyd's energy level is used to center a point in a region and ensure reduced proximity between points, thus maximizing the blue noise characteristics of the points distribution, i.e., a large mutual distance with no grouping artifact. In some example embodiments, the energy level (F) can initially be a random value, and the energy level factor can be finally determined during the optimization phase described below. The first region 310 is also assigned a configurable capacity value C (also referred to herein as an overlap constraint C) that determines the acceptable overlap between the energy level F of the first region 310 and an energy level of a neighboring region 312 to the first region 310 (i.e., the overlap between two neighboring cells on different channels).

Figure 2B:
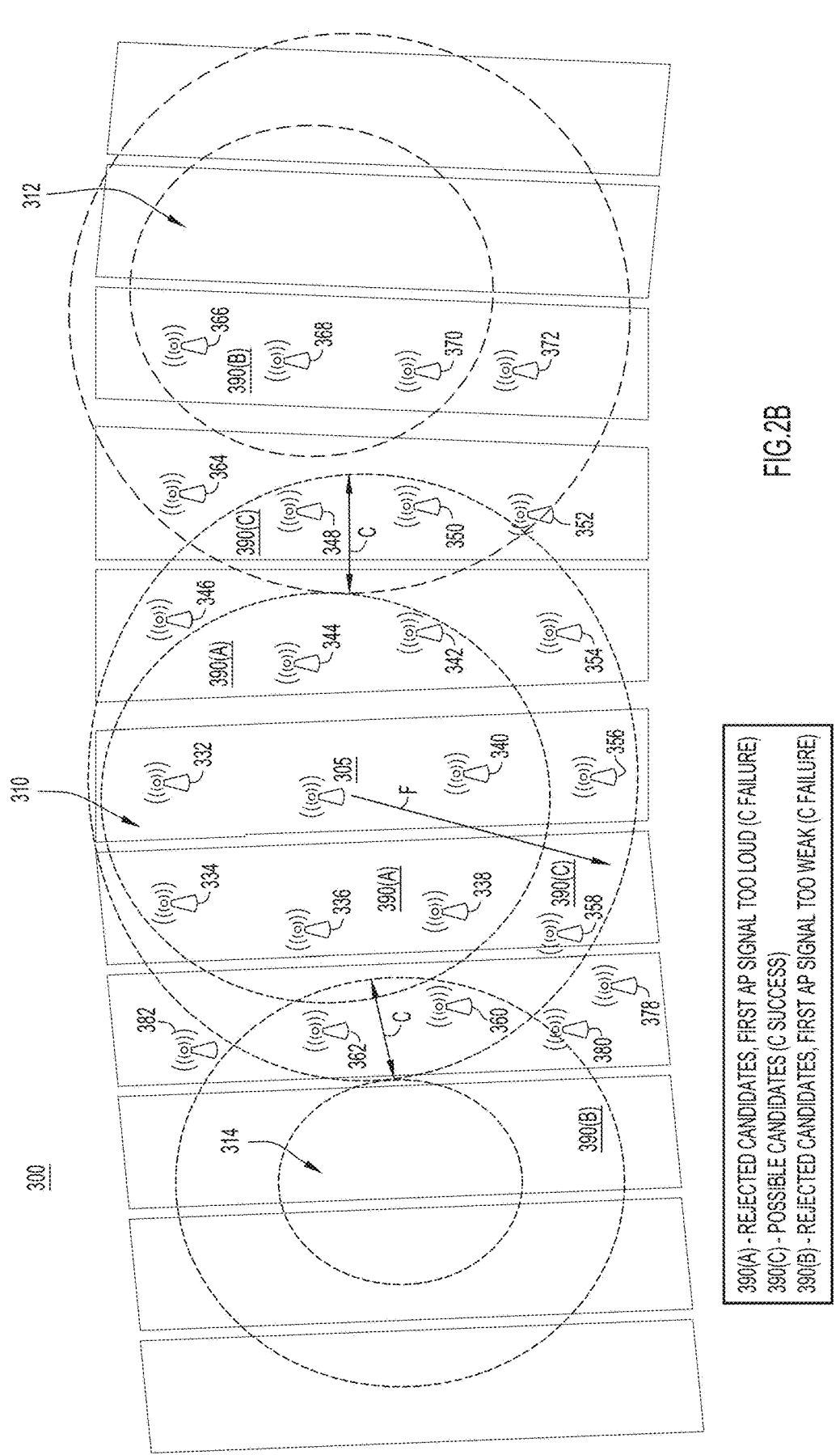
FIG. 2B shows an example of an iterative descent process in the first region with respect to the first access point (constrained tessellation), according to an example embodiment.

FIG. 2B illustrates an iterative descent process that is performed for the first region with respect to the first AP (constrained tessellation), according to an example embodiment. As shown in FIG. 2B, a gradient descent process enables the next region position to fulfill the constraint C, while keeping the center of the neighboring region at the position of an AP (F).

In FIG. 2B, the first AP 305 is selected (as a target AP) and each of the neighboring APs (e.g., APs 332-344, APs 346-362, 364-382, etc.) are evaluated to determine whether to discard/reject the neighboring AP or select the neighboring AP as a possible next region center candidate AP. In the gradient descent process, the neighboring APs whose signal level is too loud (too close) from the perspective of the first AP 305 are considered rejected candidates (C failure) and discarded. The neighboring APs that are rejected for having a signal level that is too strong from the perspective of the first AP 305 include APs 332, 334, 336, 338, 340, 342, and 344 shown in area 390(A) in FIG. 2B.

As further APs are evaluated in FIG. 2B, the neighboring APs for which the signal is too weak (too far away) with respect to the first AP 305 are also considered rejected candidates and discarded (C failure). The neighboring APs that are rejected for having a signal level that is too weak from the perspective of the first AP 305 include APs 364, 366, 368, 370, 372, 352, 378, 380, and 382 shown in area 390(B) in FIG. 2B. The remaining APs that are neither too loud/close together nor too weak/far away from the perspective of the first AP 305 are considered possible candidates (C success). The neighboring APs that are identified as possible candidates for having a signal level that is not too strong and not too weak from the perspective of the first AP 305 include APs 346, 348, 350, 354, 356, 358, 360, and 362 shown in area 390(C) in FIG. 2B. For example, these possible candidate APs have a signal level in a target range, which is less than an upper energy level threshold and greater than a lower energy level threshold, which is sufficient to fulfill the overlap constraint C assigned to region 310 (with respect to the energy level of the neighboring region 312 and/or 314 in FIG. 2B). However, FIG. 2B is intended to be a non-limiting illustrative example, and in practice the beam patterns and RF signal propagation from each AP can be complicated and not match a perfectly uniform geometry. In a variation of the example embodiment of FIG. 2B, the AP 354 may have an antenna that has low gain in the direction of the first AP 305 while the AP 352 has higher gain in that direction, in which case AP 354 may instead be a rejected candidate if its signal is too strong from the perspective of the first AP 305 while AP 352 may instead be a possible candidate if its signal is not too weak from the perspective of the first AP 305. Other similar variations in the distinguishing of possible candidate APs that satisfy the overlap constraint from rejected candidate APs that do not satisfy the overlap constraint C are also possible while taking varying beam patterns and signal propagation into consideration.

Figures 3A, 3B:
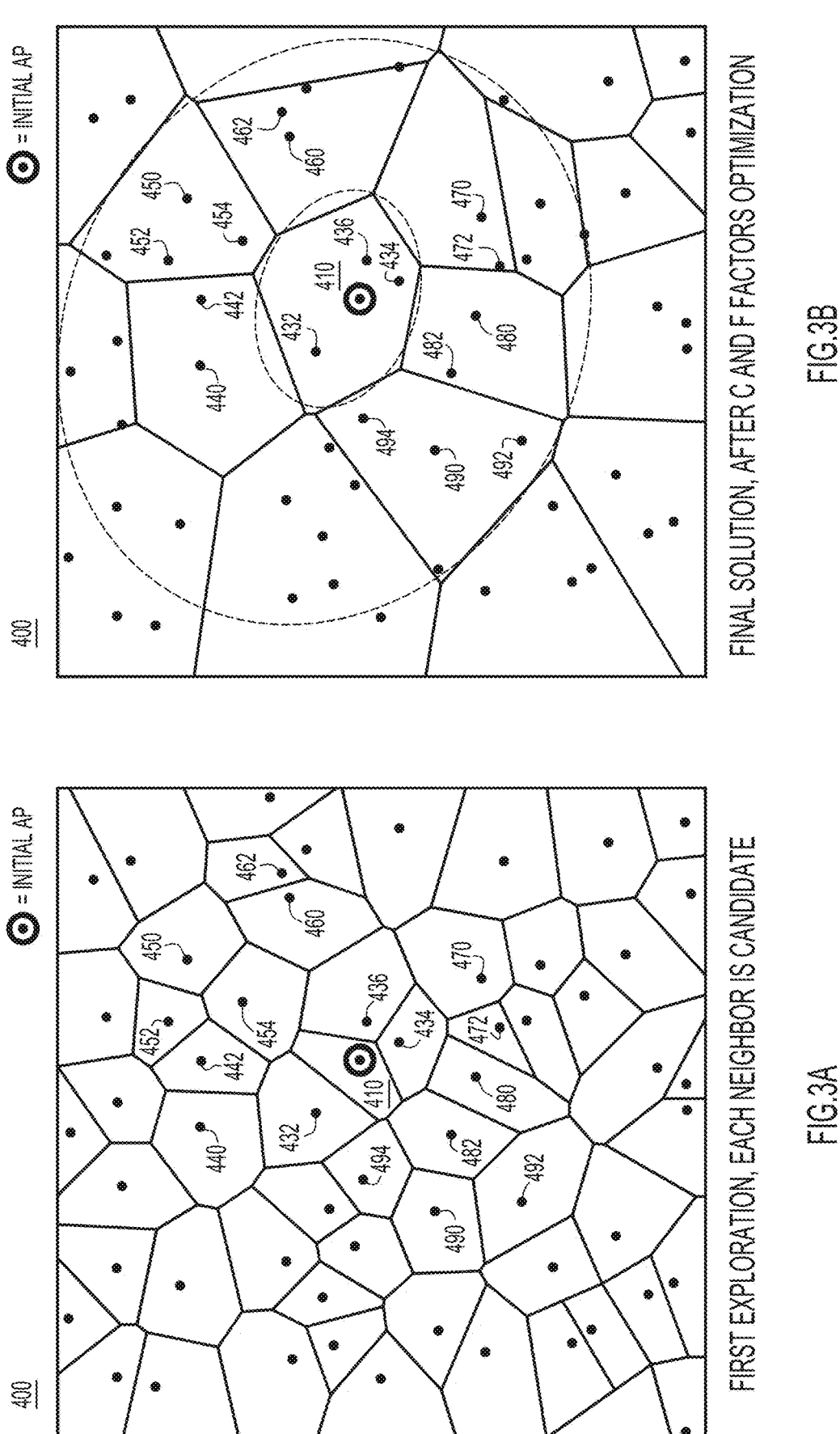
FIG. 3A shows a first exploration of the iterative descent process, where each neighboring access point is considered a candidate, according to an example embodiment.
FIG. 3B shows a final solution of the iterative descent process, after optimization of a configurable capacity value (overlap constraint) and an energy level factor, according to an example embodiment.

Reference is now made to FIGS. 3A and 3B. FIG. 3A shows a first exploration of the iterative descent process, where each neighboring access point is considered a candidate, according to an example embodiment. FIG. 3B shows a final solution of the iterative descent process, after optimization (e.g., initial configuration, along with any subsequent adjustments to maximize wireless coverage for client devices in the venue while minimizing overlap of AP signals) of the configurable capacity value (overlap constraint C) and the energy level (F) factors, according to an example embodiment. In FIGS. 3A and 3B, a partial view of a system 400 is shown that includes a first AP 410 (indicated by a dot in a circle) and a number of neighboring APs (e.g., APs 432, 440, 442, 450, 452, 454, 460, 462, 470, 472, 480, 482, 490, 492 and 494, etc., indicated by dots) in proximity to the first AP 410.

The first AP 410 is selected as the initial AP. Each of the possible candidate APs (e.g., APs 432, 440, 442, 450, 452, 454, 460, 462, 470, 472, 480, 482, 490, 492 and 494.) is evaluated in turn, a region is built around the possible candidate AP, and neighboring APs to the possible candidate AP are evaluated to become the next region center. As shown in FIG. 3A, the initial tessellation represents a high density of APs. As the process repeats, some candidate APs are eliminated (either because tessellation fails continuity, i.e., the regions formed do not cover the entire target area, or no further candidate AP is found), thereby surfacing the best next candidates.

At the end of the iterative descent process, a possible map of APs is formed, as shown in FIG. 3B. After the algorithm converges, the geometric shapes representing AP tessellation coverage become larger, with less overlap. In FIG. 3B, the APs of system 400 are all shown, but only one AP is active in each contributing shape of the tessellation graph. In one example embodiment, the process may then stop here. In another example embodiment, however, another initial AP is randomly chosen and the iterative descent process repeats. In the end, the combination of APs that minimize the overlap constraint (C), while ensuring that the entire region is covered using the energy level (F), is selected as the best candidate.

At the end of this configuration/optimization phase, the initial AP map is formed with two types of APs: active APs and passive APs. The APs that are in the center of a region are active APs. In FIG. 3B, the active APs in the center of their respective regions include, in addition to the initial AP 410, its neighboring APs 440, 450, 460, 470, 480, 490, etc. These active APs are in range of neighbors on other channels, but not in range of neighbors on the same channel above a threshold signal level determined by the factor F. Active APs transmit and receive on a given channel. The APs that are not in the center of a respective region are passive APs. In FIG. 3B, the passive APs that are not in the center of their respective regions include, in addition to neighboring APs 432, 434 and 436 in the same region as the initial AP 410, the neighboring APs 442, 452, 454, 462, 472, 482, 492, 494, etc., in other neighboring regions. These passive APs are redundant when the large public venue is empty, and placed into a passive mode (e.g., monitor mode). In the passive/monitoring mode, the passive APs do not send any beacons and do not accept any client (they can be powered on, but are in "receive-only" mode).

In some example embodiments, the energy level (F) factor also determines the number of detected APs for any client in the LPV, at any point of the coverage area, and can be configured to minimize that number of detected APs (e.g., 3 APs maximum). The outcome of this configuration/optimization phase is that a client device in the LPV will only detect a small number of APs (e.g., up to three APs) at a good, received signal strength index (RSSI) level, thereby limiting noise/interference from receiving signals from multiple APs.

FIG. 4 shows a flow chart of a method 500 for adaptive presence-based radio configuration of access points, according to an example embodiment. The APs may be distributed throughout a large public venue in which user density can vary over time or in different scenarios, for example.

Method 500 includes defining a number of regions in the venue in which a plurality of access points are deployed, each region having a center point, at step 510, and assigning a first AP to a first region of the regions, where the first AP is positioned at the center of the first region, at step 515.

Method 500 also includes affecting a first energy level (F) in the first region at step 520, where the first energy level (F) corresponds to a power of a transmit signal emitted by the first access point (which is used to center a point in a region and ensure reduced proximity between points). Further, method 500 includes assigning, to the first region, a configurable capacity value (C) that determines an acceptable overlap constraint between the first energy level of the first region and an energy level of a neighboring region to the first region, at step 525.

Method 500 additionally includes generating data describing a tessellation graph in which a possible map of the plurality of access points is formed using an iterative descent process that enables the next region position to fulfill the configurable capacity value (overlap constraint C), while keeping the center of the neighboring region on the position of an AP, at step 530.

Thus, method 500 involves an iterative descent process in which constrained tessellation is applied in the Wi-Fi context. In the first exploration, each neighboring AP is a next region center candidate AP, and the initial tessellation represents a high density of APs. Generating the data describing the tessellation graph using the iterative descent process of step 530 includes evaluating neighboring APs of the plurality of APs around the first AP, designating one or more neighboring APs whose signal level is above an upper threshold with respect to the first AP (i.e., too loud from the perspective of the first AP, too close together) as rejected candidates, designating one or more neighboring APs whose signal level is below a lower threshold with respect to the first AP (i.e., too weak from the perspective of the first AP, too far apart) as rejected candidates, and selecting one or more neighboring APs whose signal level is between the upper threshold and the lower threshold with respect to the first AP (i.e., not too loud/close and not too weak/far) as possible candidates. Thus, the remaining APs that have a signal level that fulfills the overlap constraint C are selected as possible next region center candidates. Eventually, in the final solution at the end of the iterative descent process after the overlap constraint (C) and energy level (F) factors have been optimized, a possible map of APs is formed in which only one AP is powered up and made active in each region of the tessellation graph (and the other APs in that same region are powered down and made passive). The APs that are in the center of a respective region in the tessellation graph are powered up (active APs), while the other APs that are not in the center are powered down (passive APs) and placed in receiver-only monitoring mode.

In some example embodiments, generating data describing the tessellation graph using the iterative descent process may be performed based on positions of the APs on a map or floorplan of the venue, or by determining relative RF positions of the APs based on individual AP detection of neighboring APs. The first energy level may be selected or adjusted so as to minimize the number of detected APs by a wireless client device operating in the venue. Accordingly, one or more of an operating mode, a channel structure, and a transmit power level of one or more APs can be dynamically adapted so as to minimize cross-AP interference, where the operating mode is one of a passive monitoring mode (in which passive APs only receive signals and do not transmit signals) and an active mode (in which active APs both transmit and receive signals). The number of regions defined may correspond to a number of available channels for APs to operate in the venue, for example.

Figure 5B:
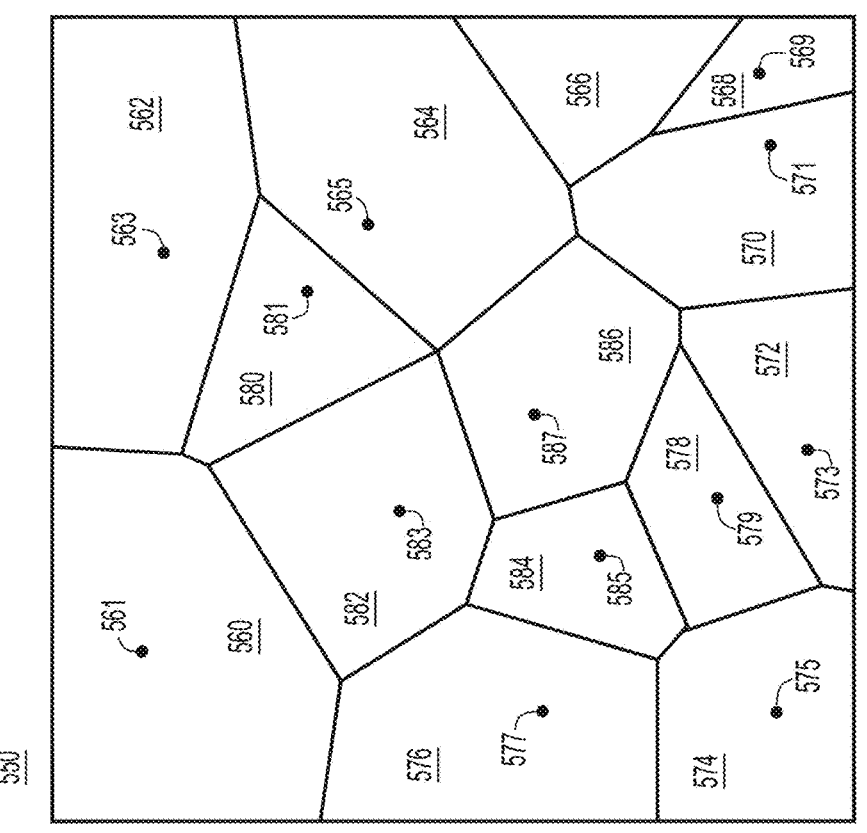
FIG. 5B shows a second tessellation graph, in which the tessellation for the region of FIG. 5A in which the user density increase was detected is rebuilt, according to an example embodiment.
Figure 5A:
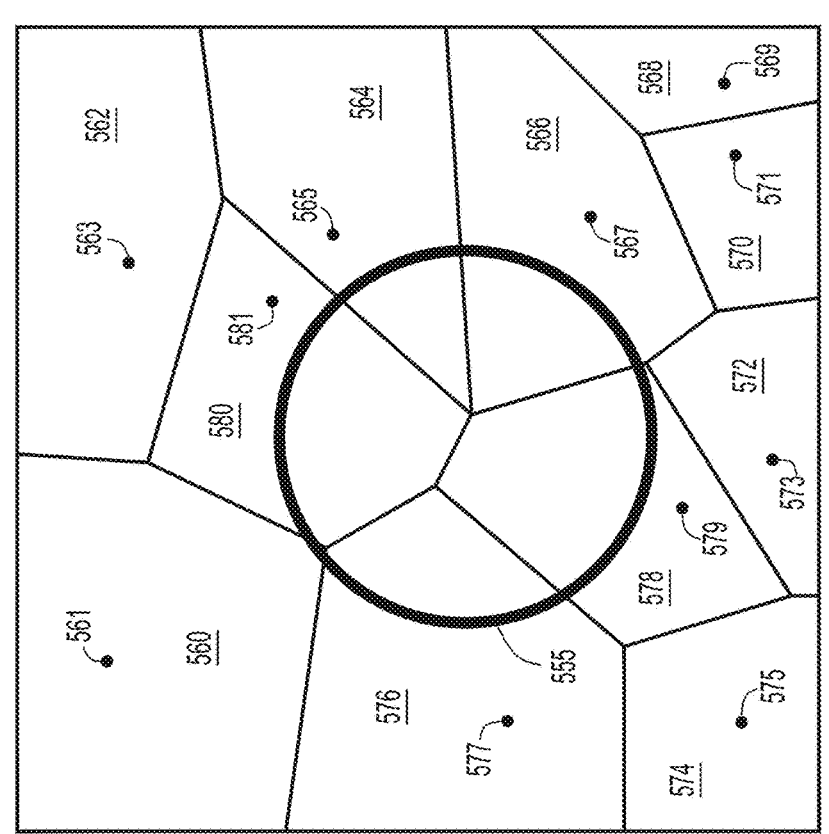
FIG. 5A shows a first tessellation graph, in which a user density increase has been detected in a region, according to an example embodiment.

Next, referring to FIGS. 5A and 5B, the changing density of users around APs (active or passive) is considered using a predictive model or by measuring the density of Wi-Fi traffic, according to some example embodiments.

In one example embodiment that utilizes a predictive model to estimate when and how densities of users around APs in the LPV may change over time during an event or in different scenarios, the network controller 110 (FIG. 1) is connected to a ticket management system. In the predictive model, each event time and seat sale is known, and that information may be used to associate a projected growing density of users for each zone of the LPV (e.g., based on historical data). For example, Thursday night's event sees the seats allocated to the local team's fans sold at 70% (with details of which seats are sold), while the guest team side is sold at 25%; past records indicate that fans arrive between 5:20 and 5:45 PM, for a game start at 6:00 PM, and an end at 9:00 PM, where the fans leave the LPV within 15 minutes of the end of the event.

In another example embodiment, the APs measure the density of Wi-Fi traffic. For example, active APs measure the number of connected clients and their traffic volume, and all APs measure the number of probe requests per time interval (probe density). All APs also measure detected active APs signal levels. This measured information can then be used to detect changing densities of users around APs in the LPV at different times during an event or in different scenarios.

FIG. 5A shows a first tessellation graph, in which a user density increase has been detected in a region, according to an example embodiment. In FIG. 5A, a partial view of a system 550 is shown, where the system 550 includes a number of regions (e.g., regions 560, 562, 564, 566, 568, 570, 572, 574, 576, 578, and 580) with a corresponding active AP (e.g., APs 561, 563, 565, 567, 569, 571, 573, 575, 577, 579, and 581) positioned at or near the center of each of these regions, respectively. The region for which the user density increase is detected is denoted as region 555 in FIG. 5A, where region 555 corresponds to one or more sections of a venue and includes portions of regions 564, 566, 576, 578, and 580. Referring to FIG. 5A, an increase of the client/user density around a given AP region causes a decrease/reduction, for that AP, of its energy level (F) factor (and also the configurable capacity value/overlap constraint (C), as a secondary effect).

FIG. 5B shows a second tessellation graph, in which the tessellation for the region of FIG. 5A in which the user density increase was detected is rebuilt, according to an example embodiment. In FIG. 5B, in addition to the regions 560, 562, 564, 566, 568, 570, 572, 574, 576, 578, and 580 and corresponding APs 561, 563, 565, 567, 569, 571, 573, 575, 577, 579, and 581, the system 550 includes some additional regions (e.g., regions 582, 584, and 586) with a corresponding active AP (e.g., APs 583, 585, and 587) positioned at or near the center of each of these additional regions, respectively. The new regions 582, 584, and 586 in FIG. 5B correspond to the region 555 of FIG. 5A for which the user density increase was detected. In creating the new regions 582, 584 and 586, several of the shapes of the tessellation graph around the APs are modified. Thus, beyond a density increase threshold, the tessellation graph is rebuilt for that particular region based on the new energy level (F) factor for that area, as shown in FIG. 5B. The effect of the reconstruction is that some APs of system 550 that were previously passive APs are activated (e.g., APs 583, 585, 587 are switched from passive/monitor mode to active mode). In some cases, neighboring boundaries may also need to be rebuilt and some previously active APs may be switched to passive/monitor mode.

Thus, when user density increases in a particular region around an AP (refer to FIG. 5A) such that it reaches some predetermined threshold, the tessellation for this region is rebuilt (refer to FIG. 5B), according to example embodiments. It should be noted that the aggressiveness or sensitivity (threshold) for triggering the tessellation reconstruction is configurable. On one extreme, the initial structure follows the "empty stadium" model, and the tessellation is reconfigured only once (e.g., at the time of the beginning of the game). At the other extreme, the tessellation is reconfigured in near real time, as user density varies (e.g., people walking to the seats, etc.). In a practical use case, a timer or counter can cause the tessellation reconstruction to start only when discrete density thresholds are reached, for example. For example, the density increase/decrease thresholds may be absolute (e.g., different density tiers between an empty stadium and full capacity) or relative (e.g., rapidly changing density at different times throughout the course of an event).

A decrease/reduction in the user density around a given AP region causes an increase, for that AP, of its energy level (F) factor. Thus, as user density decreases, the tessellation reconstruction occurs in the reverse direction (energy level F increases and active APs are set farther apart, while some intermediate APs now become passive APs). The outcome enables providing a consistent coverage for the users, while avoiding AP signal over-density (which would otherwise cause a poor user experience and high AP-to-AP noise).

As depicted in FIGS. 5A and 5B, the techniques presented herein for adaptive presence-based radio configuration of access points may further include dynamically adapting one or more of an operating mode (switching between active mode and passive/monitoring mode), a channel structure, and a transmit power level of one or more APs according to the density of users around each AP in each area of the venue. This adaptation can help to minimize (limit or reduce) cross-AP interference as the variable density of users in the LPV changes over time and/or in different scenarios.

In this variation, the techniques may further include detecting a change in a density of users in one or more regions (refer to FIG. 5A), and repeating the generating of data describing the tessellation graph for the one or more regions in which the change in the density of users is detected (refer to FIG. 5B). For example, detecting the change in the density of users in the one or more regions around APs (whether active or passive) can be performed using a predictive model (e.g., based on known and historical data). Alternatively, detecting the change in the density of users in the one or more regions may include measuring the density of wireless traffic through APs in the one or more regions, and determining that the density of wireless traffic reaches or exceeds a density increase threshold or a density decrease threshold. For example, active APs measure the number of connected client devices and their traffic volume, and all APs (including the passive APs in monitoring mode) measure the number of probe requests per time interval and also measure the signal level of detected active APs. Thus, the APs and/or the network controller can then detect changes in user density for each section of the LPV.

An increase of the user density around a given AP region causes a decrease of the energy level (F) for that AP (signal gets weaker or does not propagate as far when more users are present nearby), whereas a decrease of the user density around a given AP region causes an increase of the energy level (F) for that AP (signal gets stronger or propagates farther when fewer users are present nearby). When discrete density change thresholds are reached, this will trigger the reconstruction of the tessellation graph based on the new higher/lower energy level factor for that area. In this variation of the techniques, generating data describing the tessellation graph for the one or more regions when the density increase threshold is reached or exceeded includes activating one or more APs that were operating in a passive monitoring mode (switched to active mode), whereas generating data describing the tessellation graph for the one or more regions when the density decrease threshold is reached or exceeded includes deactivating one or more APs that were operating in an active mode (switched to passive monitoring mode). When the user density increases, some passive APs may be activated or powered up (active mode). When the user density decreases, some active APs may be deactivated or powered down (passive monitoring mode). The resulting outcome is providing consistent coverage for the users, while avoiding AP signal over-density that causes high AP-to-AP noise (e.g., by ensuring that a given AP only hears a certain number of neighboring APs).

Thus, RF characteristics of a large public venue, such as a stadium, can change dramatically when fans are, and are not, located in their respective seats, especially for under-seat AP deployments as explained above. Example embodiments described herein are adapted to dynamically turn APs on and off (i.e., switch operating modes), in order to ensure that client devices have a desired coverage, while also ensuring that an AP hears only a constrained or limited number of neighboring APs. A passive AP (powered down or deactivated) can use a monitoring mode to determine when to become an active AP (when to power back up or activate), as a result of the changing user density over time or in different scenarios and the corresponding density increase/ decrease thresholds. This can be very useful for any high-density Wi-Fi application, especially in large public venues.

Figure 6:
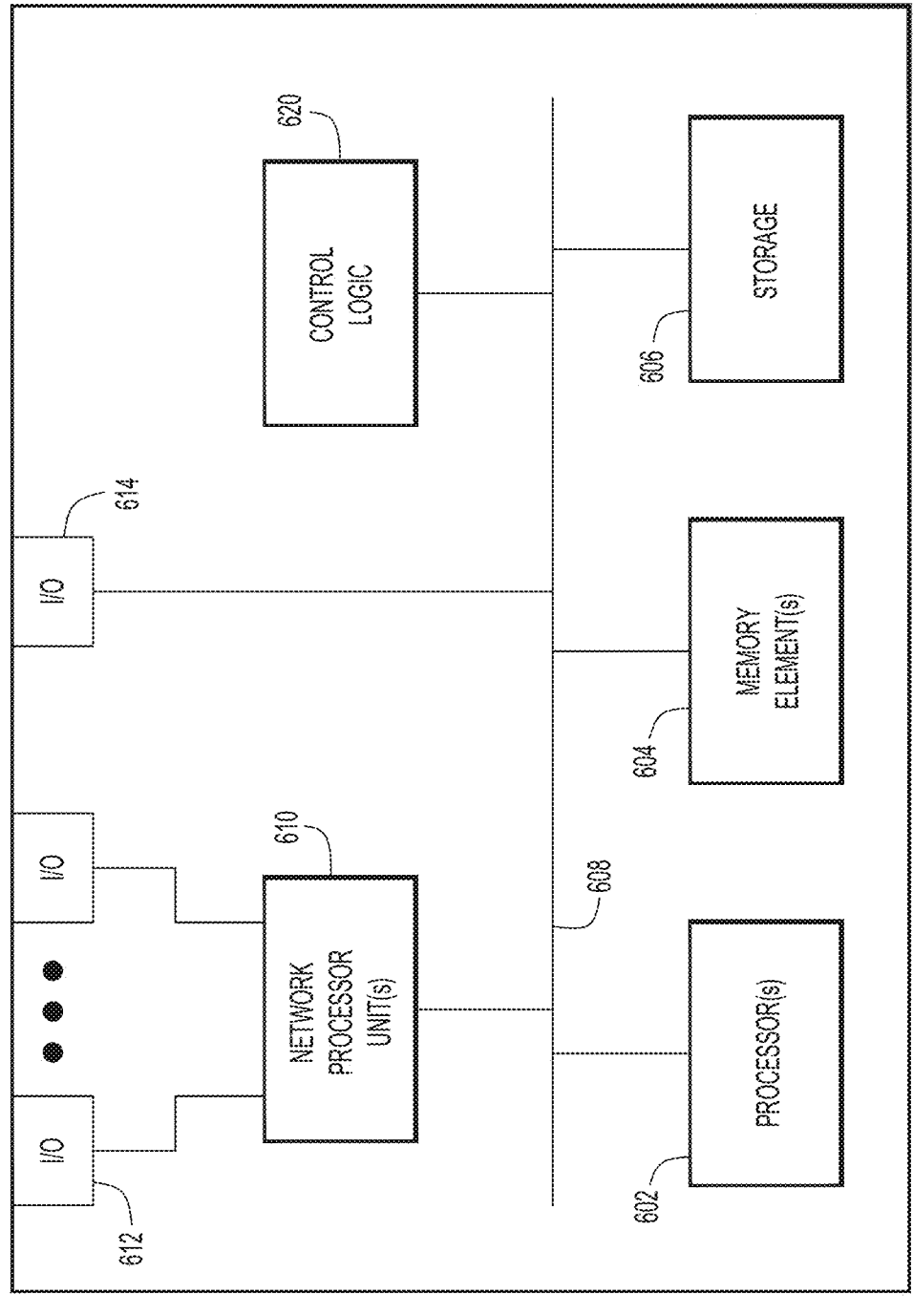
FIG. 6 shows a hardware block diagram of an example computing device that may perform functions associated with operations discussed herein.

Referring to FIG. 6, FIG. 6 illustrates a hardware block diagram of a computing device 600 that may perform functions associated with operations discussed herein in connection with the techniques depicted in FIGS. 2A, 2B, 3A, 3B, 4, 5A and 5B. In various embodiments, a computing device or apparatus, such as computing device 600 or any combination of computing devices 600, may be configured as any entity/entities as discussed for the techniques depicted in connection with FIGS. 2A, 2B, 3A, 3B, 4, 5A and 5B (such as the network controller 110 of FIG. 1A) in order to perform operations of the various techniques discussed herein.

In at least one embodiment, the computing device 600 may be any apparatus that may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the'(s)' nomenclature (e.g., one or more element(s)).

In some aspects, the techniques described herein relate to a method for adaptive presence-based radio configuration of access points in a venue, the method including: defining a number of regions in the venue in which a plurality of access points are deployed, each region having a center point; assigning a first access point to a first region of the regions, and the first access point is positioned at the center point of the first region; affecting a first energy level in the first region, wherein the first energy level corresponds to a power of a transmit signal emitted by the first access point; assigning to the first region a configurable capacity value that determines an acceptable overlap constraint between the first energy level of the first region and an energy level of a neighboring region to the first region; and generating data describing a tessellation graph in which a possible map of the plurality of access points is formed using an iterative descent process that enables a next region position to fulfill the configurable capacity value while keeping a center of the neighboring region on a position of an access point.

In some aspects, the techniques described herein relate to a method, wherein generating the data describing the tessellation graph using the iterative descent process includes: evaluating neighboring access points of the plurality of access points around the first access point; designating one or more neighboring access points whose signal level is above an upper threshold with respect to the first access point as rejected candidates; designating one or more neighboring access points whose signal level is below a lower threshold with respect to the first access point as rejected candidates; and selecting one or more neighboring access points whose signal level is between the upper threshold and the lower threshold with respect to the first access point as possible next region center candidates.

In some aspects, the techniques described herein relate to a method, wherein generating the data describing the tessellation graph using the iterative descent process is performed based on positions of the access points on a map or floorplan of the venue, or by determining relative radio frequency (RF) positions of the access points based on individual access point detection of neighboring access points.

In some aspects, the techniques described herein relate to a method, further including selecting or adjusting the first energy level to minimize a number of detected access points by a wireless client device operating in the venue.

In some aspects, the techniques described herein relate to a method, further including: dynamically adapting one or more of an operating mode, a channel structure, and a transmit power level of one or more access points of the plurality of access points to minimize cross-AP interference, wherein the operating mode is one of a passive monitoring mode and an active mode.

In some aspects, the techniques described herein relate to a method, wherein the number of regions corresponds to a number of available channels for the access points to operate in the venue.

In some aspects, the techniques described herein relate to a method, further including: detecting a change in a density of users in one or more regions; and repeating the generating of data describing the tessellation graph for the one or more regions in which the change in the density of users is detected.

In some aspects, the techniques described herein relate to a method, wherein detecting the change in the density of users in the one or more regions is performed using a predictive model based on historical event data.

In some aspects, the techniques described herein relate to a method, wherein detecting the change in the density of users in the one or more regions includes measuring the density of wireless traffic through access points in the one or more regions, and further including determining that the density of wireless traffic reaches or exceeds a density increase threshold or a density decrease threshold.

In some aspects, the techniques described herein relate to a method, wherein generating data describing the tessellation graph for the one or more regions when the density increase threshold is reached or exceeded includes activating one or more access points that were operating in a passive monitoring mode; and generating data describing the tessellation graph for the one or more regions when the density decrease threshold is reached or exceeded includes deactivating one or more access points that were operating in an active mode.

In some aspects, the techniques described herein relate to an apparatus for adaptive presence-based radio configuration of access points in a venue, the apparatus including: a memory storing computer readable instructions; and a processor configured to execute the computer readable instructions to: define a number of regions in the venue in which a plurality of access points are deployed, each region having a center point; assign a first access point to a first region of the regions, and the first access point is positioned at the center point of the first region; affect a first energy level in the first region, wherein the first energy level corresponds to a power of a transmit signal emitted by the first access point; assign to the first region a configurable capacity value that determines an acceptable overlap constraint between the first energy level of the first region and an energy level of a neighboring region to the first region; and generate data describing a tessellation graph in which a possible map of the plurality of access points is formed using an iterative descent process that enables a next region position to fulfill the configurable capacity value while keeping a center of the neighboring region on a position of an access point.

In some aspects, the techniques described herein relate to an apparatus, wherein, to generate the data describing the tessellation graph using the iterative descent process, the processor is configured to execute the computer readable instructions to: evaluate neighboring access points of the plurality of access points around the first access point; designate one or more neighboring access points whose signal level is above an upper threshold with respect to the first access point as rejected candidates; designate one or more neighboring access points whose signal level is below a lower threshold with respect to the first access point as rejected candidates; and select one or more neighboring access points whose signal level is between the upper threshold and the lower threshold with respect to the first access point as possible next region center candidates.

In some aspects, the techniques described herein relate to an apparatus, wherein the processor is further configured to execute the computer readable instructions to: select or adjust the first energy level to minimize a number of detected access points by a wireless client device operating in the venue.

In some aspects, the techniques described herein relate to an apparatus, wherein the processor is further configured to execute the computer readable instructions to: dynamically adapt one or more of an operating mode, a channel structure, and a transmit power level of one or more access points of the plurality of access points to minimize cross-AP interference, wherein the operating mode is one of a passive monitoring mode and an active mode.

In some aspects, the techniques described herein relate to an apparatus, wherein the processor is further configured to execute the computer readable instructions to: detect a change in a density of users in one or more regions; and repeat the generating of data describing the tessellation graph for the one or more regions in which the change in the density of users is detected.

In some aspects, the techniques described herein relate to a non-transitory computer readable medium storing a program of instructions, which when executed by a processor of a device, cause the device to perform operations for adaptive presence-based radio configuration of access points in a venue, including: defining a number of regions in the venue in which a plurality of access points are deployed, each region having a center point; assigning a first access point to a first region of the regions, and the first access point is positioned at the center point of the first region; affecting a first energy level in the first region, wherein the first energy level corresponds to a power of a transmit signal emitted by the first access point; assigning to the first region a configurable capacity value that determines an acceptable overlap constraint between the first energy level of the first region and an energy level of a neighboring region to the first region; and generating data describing a tessellation graph in which a possible map of the plurality of access points is formed using an iterative descent process that enables a next region position to fulfill the configurable capacity value while keeping a center of the neighboring region on a position of an access point.

In some aspects, the techniques described herein relate to a non-transitory computer readable, wherein generating the data describing the tessellation graph using the iterative descent process includes: evaluating neighboring access points of the plurality of access points around the first access point; designating one or more neighboring access points whose signal level is above an upper threshold with respect to the first access point as rejected candidates; designating one or more neighboring access points whose signal level is below a lower threshold with respect to the first access point as rejected candidates; and selecting one or more neighboring access points whose signal level is between the upper threshold and the lower threshold with respect to the first access point as possible next region center candidates.

In some aspects, the techniques described herein relate to a non-transitory computer readable medium, wherein the program of instructions when executed by the processor further causes the device to perform operations including: selecting or adjusting the first energy level to minimize a number of detected access points by a wireless client device operating in the venue.

In some aspects, the techniques described herein relate to a non-transitory computer readable medium, wherein the program of instructions when executed by the processor further causes the device to perform operations including: dynamically adapting one or more of an operating mode, a channel structure, and a transmit power level of one or more access points of the plurality of access points to minimize cross-AP interference, wherein the operating mode is one of a passive monitoring mode and an active mode.

In some aspects, the techniques described herein relate to a non-transitory computer readable medium, wherein the program of instructions when executed by the processor further causes the device to perform operations including: detecting a change in a density of users in one or more regions; and repeating the generating of data describing the tessellation graph for the one or more regions in which the change in the density of users is detected.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method for adaptive presence-based radio configuration of access points in a venue, the method comprising:
defining a number of regions in the venue in which a plurality of access points are deployed, each region having a center point;
assigning a first access point to a first region of the regions, and the first access point is positioned at the center point of the first region;
affecting a first energy level in the first region, wherein the first energy level corresponds to a power of a transmit signal emitted by the first access point;
assigning to the first region a configurable capacity value that determines an acceptable overlap between the first energy level of the first region and an energy level of a neighboring region to the first region; and
generating data describing a tessellation graph in which a possible map of the plurality of access points is formed that enables a next region position to fulfill the configurable capacity value while keeping a center of the neighboring region on a position of an access point.

2. The method of claim 1, wherein generating the data describing the tessellation graph to fulfill the configurable capacity value is performed using an iterative descent process that includes:
evaluating neighboring access points of the plurality of access points around the first access point;
designating one or more neighboring access points whose signal level is above an upper threshold with respect to the first access point as rejected candidates;
designating one or more neighboring access points whose signal level is below a lower threshold with respect to the first access point as rejected candidates; and
selecting one or more neighboring access points whose signal level is between the upper threshold and the lower threshold with respect to the first access point as possible next region center candidates.

3. The method of claim 2, wherein generating the data describing the tessellation graph using the iterative descent process is performed based on positions of the access points on a map or floorplan of the venue, or by determining relative radio frequency (RF) positions of the access points based on individual access point detection of neighboring access points.

4. The method of claim 1, further comprising selecting or adjusting the first energy level to minimize a number of detected access points by a wireless client device operating in the venue.

5. The method of claim 1, further comprising:
dynamically adapting one or more of an operating mode, a channel structure, and a transmit power level of one or more access points of the plurality of access points to minimize cross-AP interference, wherein the operating mode is one of a passive monitoring mode and an active mode.

6. The method of claim 5, wherein the number of regions corresponds to a number of available channels for the access points to operate in the venue.

7. The method of claim 1, further comprising:
detecting a change in a density of users in one or more regions; and
repeating the generating of data describing the tessellation graph for the one or more regions in which the change in the density of users is detected.

8. The method of claim 7, wherein detecting the change in the density of users in the one or more regions is performed using a predictive model based on historical event data.

9. The method of claim 7, wherein detecting the change in the density of users in the one or more regions includes measuring the density of wireless traffic through access points in the one or more regions, and further comprising determining that the density of wireless traffic reaches or exceeds a density increase threshold or a density decrease threshold.

10. The method of claim 9, wherein generating data describing the tessellation graph for the one or more regions when the density increase threshold is reached or exceeded includes activating one or more access points that were operating in a passive monitoring mode; and generating data describing the tessellation graph for the one or more regions when the density decrease threshold is reached or exceeded includes deactivating one or more access points that were operating in an active mode.

11. An apparatus comprising:

a memory storing computer readable instructions; and a processor configured to execute the computer readable instructions to:

define a number of regions in a venue in which a plurality of access points are deployed, each region having a center point;

assign a first access point to a first region of the regions, and the first access point is positioned at the center point of the first region;

affect a first energy level in the first region, wherein the first energy level corresponds to a power of a transmit signal emitted by the first access point;

assign to the first region a configurable capacity value that determines an acceptable overlap between the first energy level of the first region and an energy level of a neighboring region to the first region; and generate data describing a tessellation graph in which a possible map of the plurality of access points is formed that enables a next region position to fulfill the configurable capacity value while keeping a center of the neighboring region on a position of an access point.

12. The apparatus of claim 11, wherein, to generate the data describing the tessellation graph to fulfill the configurable capacity value, the processor is configured to execute the computer readable instructions to:

evaluate neighboring access points of the plurality of access points around the first access point;

designate one or more neighboring access points whose signal level is above an upper threshold with respect to the first access point as rejected candidates;

designate one or more neighboring access points whose signal level is below a lower threshold with respect to the first access point as rejected candidates; and select one or more neighboring access points whose signal level is between the upper threshold and the lower threshold with respect to the first access point as possible next region center candidates.

13. The apparatus of claim 11, wherein the processor is further configured to execute the computer readable instructions to:

select or adjust the first energy level to minimize a number of detected access points by a wireless client device operating in the venue.

14. The apparatus of claim 11, wherein the processor is further configured to execute the computer readable instructions to:

dynamically adapt one or more of an operating mode, a channel structure, and a transmit power level of one or more access points of the plurality of access points to minimize cross-AP interference, wherein the operating mode is one of a passive monitoring mode and an active mode.

15. The apparatus of claim 11, wherein the processor is further configured to execute the computer readable instructions to:

detect a change in a density of users in one or more regions; and repeat the generating of data describing the tessellation graph for the one or more regions in which the change in the density of users is detected.

16. A non-transitory computer readable medium storing a program of instructions, which when executed by a processor of a device, cause the device to perform operations comprising:

defining a number of regions in a venue in which a plurality of access points are deployed, each region having a center point;

assigning a first access point to a first region of the regions, and the first access point is positioned at the center point of the first region;

affecting a first energy level in the first region, wherein the first energy level corresponds to a power of a transmit signal emitted by the first access point;

assigning to the first region a configurable capacity value that determines an acceptable overlap between the first energy level of the first region and an energy level of a neighboring region to the first region; and generating data describing a tessellation graph in which a possible map of the plurality of access points is formed that enables a next region position to fulfill the configurable capacity value while keeping a center of the neighboring region on a position of an access point.

17. The non-transitory computer readable of claim 16, wherein generating the data describing the tessellation graph to fulfill the configurable capacity value is performed using an iterative descent process that includes:

evaluating neighboring access points of the plurality of access points around the first access point;

designating one or more neighboring access points whose signal level is above an upper threshold with respect to the first access point as rejected candidates;

designating one or more neighboring access points whose signal level is below a lower threshold with respect to the first access point as rejected candidates; and selecting one or more neighboring access points whose signal level is between the upper threshold and the lower threshold with respect to the first access point as possible next region center candidates.

18. The non-transitory computer readable medium of claim 16, wherein the program of instructions when executed by the processor further causes the device to perform operations comprising:

selecting or adjusting the first energy level to minimize a number of detected access points by a wireless client device operating in the venue.

19. The non-transitory computer readable medium of claim 16, wherein the program of instructions when executed by the processor further causes the device to perform operations comprising:

dynamically adapting one or more of an operating mode, a channel structure, and a transmit power level of one or more access points of the plurality of access points to minimize cross-AP interference, wherein the operating mode is one of a passive monitoring mode and an active mode.

20. The non-transitory computer readable medium of claim 16, wherein the program of instructions when executed by the processor further causes the device to perform operations comprising:

detecting a change in a density of users in one or more regions; and repeating the generating of data describing the tessellation graph for the one or more regions in which the change in the density of users is detected.

\* \* \* \* \*